No. 740,858. PATENTED OCT. 6, 1903.
G. H. HOSMER.
BREAD.
APPLICATION FILED DEC. 4, 1902.
NO MODEL.

WITNESSES:

INVENTOR.
George H. Hosmer.
BY E. W. Anderson
his ATTORNEY.

No. 740,858. Patented October 6, 1903.

UNITED STATES PATENT OFFICE.

GEORGE H. HOSMER, OF EVERETT, MASSACHUSETTS.

BREAD.

SPECIFICATION forming part of Letters Patent No. 740,858, dated October 6, 1903.

Application filed December 4, 1902. Serial No. 133,908. (No specimens.)

*To all whom it may concern:*

Be it known that I, GEORGE H. HOSMER, a citizen of the United States, and a resident of Everett, in the county of Middlesex and State of Massachusetts, have made a certain new and useful Invention in Articles of Food; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
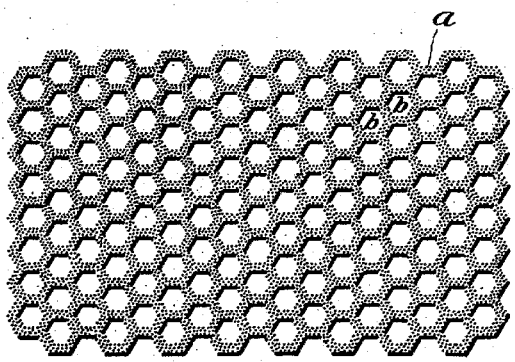
Figure 2:
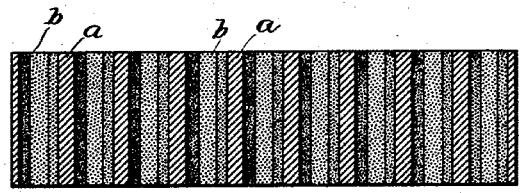

Figure 1 is a top view. Fig. 2 is a sectional view.

The object of the invention is the production of an article of food or bread from wheat or other cereal, said article having a deep cellular structure positively formed on right lines and of small diameter whereby the food will easily receive and positively retain a liquid or semiliquid filling of butter, honey, fruit sauce, or other flavoring concomitant.

In the accompanying drawings, illustrating the invention, the letter $a$ designates the interstitial vertical wall of the bread-comb, and $b\ b$ the right-line cells, which are separated from each other by this wall. These cells may be of circular or prismatic form in cross-section, the preferable form being hexagonal, as this form keeps the interstitial wall of equal thickness, so that in baking an equalized effect is produced.

The cakes or biscuits are made in forms, the capillary cells being made by means of a number of projections of hexagonal or other cross-section desired attached to a base-plate and separated from each other above said base by the interstitial interval, which is filled with a preparation of dough of proper consistency. When the article is baked, the plate, with its projections, is raised, and the cores being drawn out of the bread it is left in the form of a cellular comb-like cake, peculiarly adapted to receive and hold honey, butter, syrup, and fruit juices or sauces of various character. Being porous on account of its structure, the use of yeast or baking powders is not required. In this article of food the cells are quite small in aperture compared with their depth, being usually from one-tenth to one-quarter of an inch in diameter and from one-half inch to one inch in thickness and are of geometric regularity, being right-lined and parallel. The intervening or separating wall between the cells having its opposite surfaces parallel to each other is designed to be substantially of even thickness throughout and yet quite thin in order to effect a quick baking, providing a crisp and toasted comb.

Having described this invention, what I claim, and desire to secure by Letters Patent, is—

1. A comb of bread having deep right-line cells of small diameter parallel to each other, and separated from each other by an interstitial vertical wall of substantially equal thickness throughout, substantially as specified.

2. A comb of bread, having deep right-line hexagonal cells of small diameter, separated from each other by an interstitial wall of comparatively thin character, and of substantially equal thickness throughout its extent, substantially as specified.

In testimony whereof I affix my signature in presence of two witnesses.

GEORGE H. HOSMER.

Witnesses:
ALFRED H. LADD,
CHARLES W. DODSON.